United States Patent [19]

Abbe

[11] Patent Number: 4,728,201
[45] Date of Patent: Mar. 1, 1988

[54] LOW VELOCITY ENERGIZED GAS PARTICLE BEARING

[75] Inventor: David C. Abbe, El Cajon, Calif.

[73] Assignee: Kurt Manufacturing Company, Inc., Minneapolis, Minn.

[21] Appl. No.: 943,248

[22] Filed: Dec. 17, 1986

[51] Int. Cl.$^4$ .............................................. F16C 32/06
[52] U.S. Cl. .................................... 384/121; 384/100; 384/108; 384/123
[58] Field of Search .......... 384/99, 100, 101, 107–115, 384/121–125, 291, 292, 368, 371

[56] References Cited

U.S. PATENT DOCUMENTS

| | | | |
|---|---|---|---|
| 3,154,353 | 10/1964 | Haringx et al. | 384/101 |
| 3,328,094 | 6/1967 | Muijderman et al. | 384/125 |
| 3,376,083 | 4/1968 | Muijderman et al. | 384/123 |
| 3,494,674 | 2/1970 | Muijderman et al. | 384/113 |
| 3,497,273 | 2/1970 | Muijderman et al. | 384/113 |
| 4,380,355 | 4/1983 | Beardmore | 384/123 |
| 4,573,810 | 3/1986 | Fust et al. | 384/100 X |

FOREIGN PATENT DOCUMENTS

| | | | |
|---|---|---|---|
| 2644859 | 4/1978 | Fed. Rep. of Germany | 384/122 |
| 132642 | 11/1978 | Japan | 384/100 |

OTHER PUBLICATIONS

Chironis, Nicholas, "New Data on Gas Bearings", *Product Engineering* Dec. 7, 1964, pp. 98–101.

Muijderman, E. A., *Spiral Groove Bearings*, Phillips Technical Library, Springer-Verlag New York Inc., 1966 (translated from Dutch by Dr. R. H. Bathgate, Eindhoven).

Muijderman, E. A., et al., *Grease-Lubricated Spiral-Groove Bearings*, Philips Technical Rev. 39, pp. 184–198, 1980 No. 6/7.

*Primary Examiner*—Stuart S. Levy
*Assistant Examiner*—Thomas R. Hannon
*Attorney, Agent, or Firm*—Kinney & Lange

[57] ABSTRACT

A gas bearing designed for instantaneous 5–10 micro inch separation at startup due to regulated entry and activation of rarefield molecular gas particles. This bearing has two opposing bearing faces with carefully matched geometries. One surface having grooves with lands formed between the grooves that are designed for hydrodynamic operation. The other surface being smooth such as an optically flat plane. The lift-off occurs at startup through the friction-energized gas molecules increasing their volume, and forcing the slowly rotating bearing faces apart. To sustain this effect until the bearing interface reaches its normal design speed, a precisely contoured leading edge is formed on each land which sustains a negative molecular gas pressure in the slowly moving bearing interface, so as not to cause any unwarranted cooling or compression of the gas molecules until such speed is reached so that the normal pressurzied gas bearing liftoff has been achieved, causing the gas compression flow to become unregulated and go normal. The precision contouring of that leading edge may be easily and inexpensively created by several high speed chemical, laser, or air driven abrasive means.

5 Claims, 8 Drawing Figures

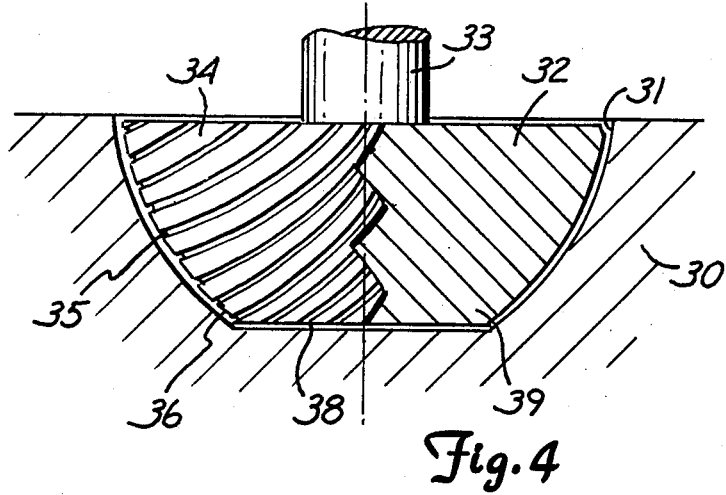
Fig. 4
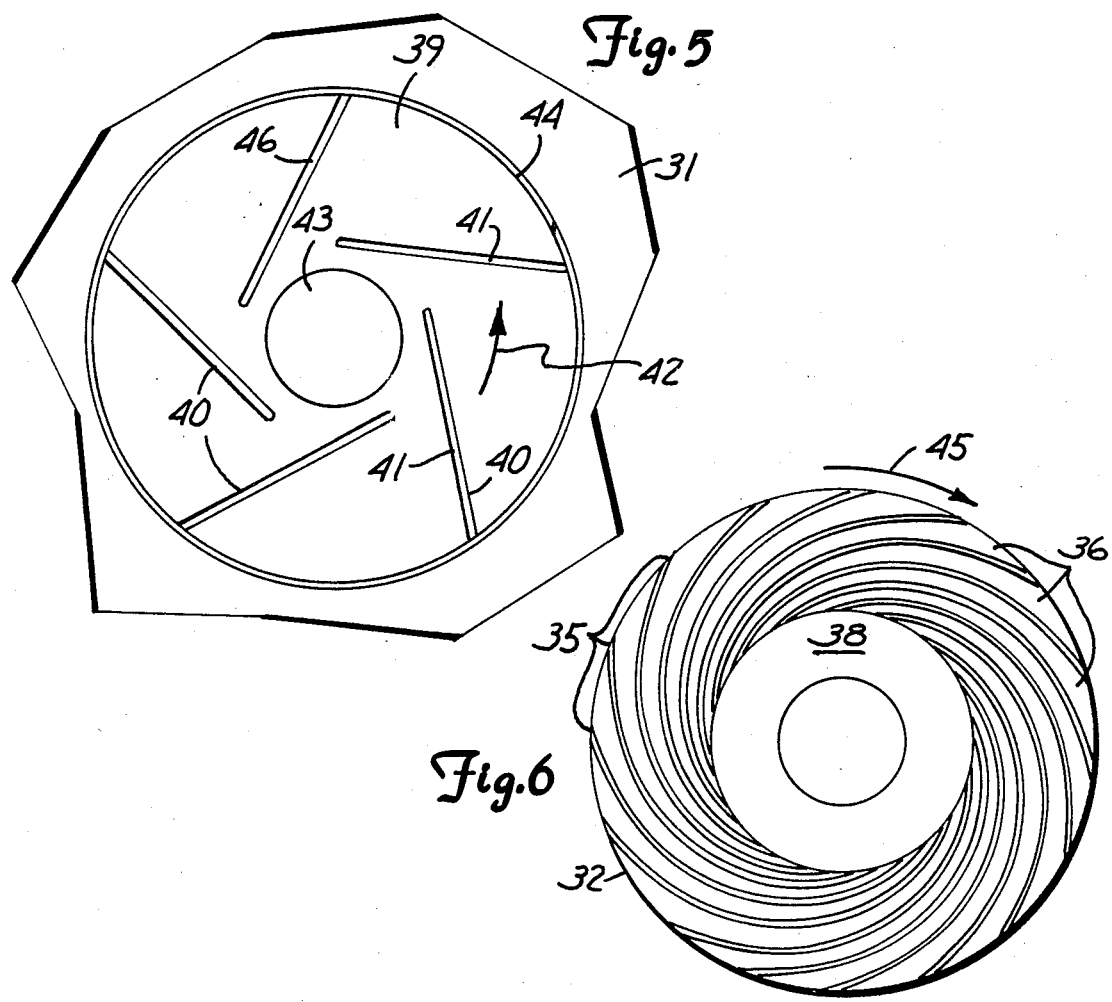
Fig. 5
Fig. 6

LOW VELOCITY ENERGIZED GAS PARTICLE BEARING

BACKGROUND OF THE INVENTION

1. Field of the Invention

The present invention relates to low friction, incompressible energized gas particle bearings for separating mating surfaces at near zero coincident velocities.

2. Description of the Prior Art

Bearings utilizing grooves formed in one face to permit a lubricating fluid to be carried onto lands that are formed between the grooves to provide a lubricating film under high relative surface speeds are known. A problem however, is getting the surface to separate or "lift off" before galling or other damage results. Early work in groove type hydrodynamic bearings of this form was carried out by E. A. Muijderman who holds a number of early U.S. patents in the hydrodynamic bearing area. For example, U.S. Pat. No. 3,328,094 issued to Muijderman on Jun. 27, 1967 shows an axial thrust bearing that includes shallow grooves in at least one of the mating members. A lubricant (not a gas specifically) is provided and it is pushed from the outer side of the bearing to the inner side by the grooves as rotation between the two parts occurs. An energized film is created between the members of the bearings as the parts rotate.

U.S. Pat. No. 3,154,353, also issued to Muijderman, which has grooves between the mating parts, relates primarily to having a cavity that is formed in a curve with an axis rotation in each instance. The grooves are formed to provide a lubricant "pump" so that upon rotation the lubricant is forced between the mating surfaces.

An additional type of self-pumping hydrodynamic bearing is shown in U.S. Pat. No. 4,573,810, issued Mar. 4, 1986 to Fust et al., wherein gently tapered lead-in surfaces are provided on sides of a groove that serves as a lubricant storage groove. This has particular adaption in connection with lubricating a belt passing through the system. However, a teaching of true operation of hydrodynamic bearing utilizing spiral grooves is missing, and the ability to provide lift-off between the individual parts at very low movement is not taught.

A comprehensive technical work relating to spiral groove bearings is in a book entitled "Spiral Groove Bearings" by E. A. Muijderman, Phillips Technical Library (1966) (Library of Congress Card Catalog No. 66-19020). Equations for predicting hydrodynamic bearing characteristics are provided.

SUMMARY OF THE INVENTION

The present invention relates to a gas bearing that provides for lift-off substantially simultaneously with any relative movement between the bearing parts, and is particularly adaptable for providing high accuracy bearings for use in computer memory disc drive applications. Very close tolerances are necessary for such applications, in order to eliminate random radial runout, and to prevent wear between the mating parts. After lift-off, another bearing system, such as a hydrodynamic bearing, supports the parts at operative speeds.

The key to obtaining accurate operation using air (gas) bearings is to get lift-off and lubrication with an air film in less than one revolution of the drive, and preferably at less than 10 r.p.m. This is done by adding energy to the gaseous system between the bearing surfaces so air molecules become active and lift the moving surface from the base. This enhances performance of air bearings by providing low friction start-up so major reductions of power needed for start-up are possible.

Molecules of air cling to the surfaces being supported and this gas molecular film is made more active by energy added because of relative motion between the parts by gas compression. The molecular mean-free path (M.M.F.P.) of a gaseous molecule such as air is a fixed value, such as 2.5 microinches, at room (ambient) temperature. The parts are in contact when at rest with some air molecules trapped within the geometric voids normal to their interface. Substantially immediately upon movement these molecules are dispersed throughout their interface and friction energized to a higher temperature which takes immediate effect as a larger M.M.F.P. and the incompressible molecular layer causes a separation of the interface which will grow larger by 5 to 20 times the initial M.M.F.P. values, thus providing noncontact liftoff at very low surface velocities.

Structurally, this is achieved by providing co-planar mating surfaces that are true to profile in cross-section within 2 M.M.F.P. on each surface, that is about five microinches, and the average deviation is no greater than four molecular mean-free paths (10 microinches). A series of grooves and lands of selected depth and cross-sectional size, with the leading edges of the lands on the side of the groove (the edge toward which air in the grooves is moved as the surfaces move relative to each other) having a rounded or tapered surface that permits entry of air molecules into the interface between the bearing surfaces at a 2-10 M.M.F.P. level to provide additional molecular support at very low levels of relative movement.

Energy is added to the air molecules that are carried in between the adjacent surfaces, which creates an early surface separation because the molecules increase in activity to provide lift-off. The separation increases and more air molecules are dragged into the space by the moving surface until such time that the speed has increased to permit normal hydrodynamic bearing effects to be created for operation.

A rarefaction effect is created at the same time. Molecules cannot get out of the space between the mating surfaces, so that the molecules become substantially incompressible, and the rarefaction effect of the molecules between the interface forces replacement of additional air molecules to enter the inlet radius gap at the lands. This will lift up the surfaces, and cause the lift-off action substantially immediately. Replenishment of the air molecules is permitted to keep the surfaces spaced, but as speeds increase and the spacing between the surfaces increases, replenishment is not permitted and some other system, such as a hydrodynamic bearing, must be provided to support the surfaces at such higher speeds. At that point, the lift-off - gas support system is effective, and the additional bearing effect such as the hydrodynamic bearing becomes effective in the range of 20-30 r.p.m. on a 2½ inch diameter disc. This can be related to the surface velocity, such as inches per second. For example, in linear or rotating motors, 0.5 inches per second will add enough energy to cause lift-off.

The disc drives are standardized at operating at 3600 r.p.m., thus the particular application requires that when up to speed the film thickness is sufficient to carry the load. Generally speaking, lift-off is considered to be about eight microinches, while the film thickness at 3600 r.p.m. in the range of 270 microinches is desirable because it will support a six pound load. The amount of load to be supported, and the height of the film required has a great influence on the depth of the grooves that are used. However, the lift-off height of eight microinches is approximately equal to four molecular mean-free path widths.

Several variables are encountered, particularly in relation to spiral grooves, including the groove depth which has previously been mentioned, the width of the grooves in relation to the width of the lands between grooves, and the groove angle as well as the radius of the inner ends of the grooves, the radius of any opening through the center of the support member, and the outer radius of the grooves. Essentially, in order to obtain high lift-off characteristics it is necessary to select a groove depth that best serves the design loads encountered, and to have the grooves approximately the same width as the lands. Preferably, however, the lands are slightly narrower than the grooves but equal width is satisfactory. The desired lift-off has been found to be available if the leading edge, or input edge of the land is made so that the surface perpendicular to the mating part terminates to leave a gap of approximately 2–10 molecular mean-free path widths, tapering into a flat land surface after a taper length no less than 100 M.M.F.P. Also, as stated, the flatness (trueness to profile and average deviation) of the mating surfaces is important.

BRIEF DESCRIPTION OF THE DRAWINGS

FIG. 4 is a part schematic sectional view of a modified form of the invention;

FIG. 5 is a part schematic view of the flat center surface of the supporting part of FIG. 4;

FIG. 6 is a plan view (looking upward in FIG. 5) of the moving ball of FIG. 5;

DETAILED DESCRIPTION OF THE PREFERRED EMBODIMENTS

A typical disc drive shaft is shown generally at 10 and in the form shown has flange 11 that rides against a support bearing 12. The support bearing 12 has an upper surface 13 in which grooves are indicated generally at 18.

Figure 2:
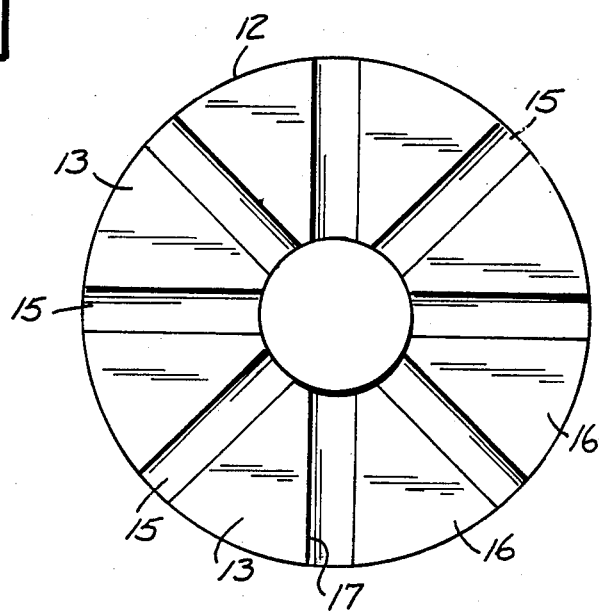
FIG. 2 is a plan schematic view of grooves on the flat center surface of the bearing of FIG. 1.
Figure 3:
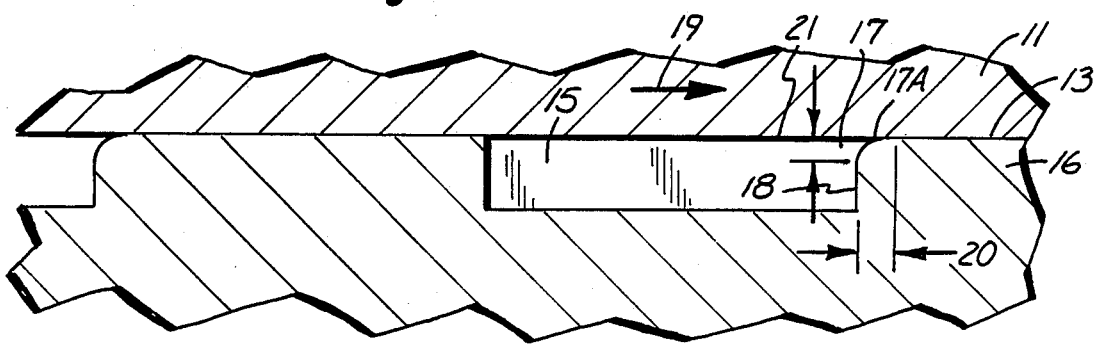
FIG. 3 is a schematic representation of the cross-section of the two mating surfaces showing a feature of the present invention and providing for the substantially instantaneous lift-off upon relative motion between the two parts.

The present invention is designed specifically to capitalize on the fact that a layer of air molecules will adhere to surfaces, and that as the two movable parts with mating surfaces are starting up, energy is added to this molecular layer causing greater molecular activity and the molecular layer is made to substantially immediately lift-off the flange or moving part 11 with respect to the bearing surface 13. As shown in FIG. 2 schematically for illustration, a number of radial grooves 15 divide the surface 13 into lands 16 which have flat surfaces facing the rotating part. Each land 16 has a leading edge corner 17 that is tapered or rounded, from a distance along a vertical surface 18 defining the leading edge of the groove, when looked at in the direction of rotation, indicated by arrow 19, of the flange 11, that is approximately equal to 10 molecular mean-free paths of the gas being used as a lubricant. For example, air can be used as a lubricant and has a M.M.F.P. of 2.5 microinches at room temperature, and this gap width ensures that the molecular structure will become substantially incompressible immediately, right at the trailing edge of the lead-in taper indicated at 17A. The length of the curved or tapered edge portion, which is indicated by the dimension 20 is preferably no less than 100 M.M.F.P. of the gas and no more than 10% of the land width. The showing in FIG. 3 is illustrative and taken near the center of the surface 13. This taper provides an area in which the boundary layer of air represented by dots 21 is reduced to a non-compressible molecular structure approximately four to eight molecular mean-free paths in width that supports the flange 11 on the bearing surface 13 of lands 16 as it initially starts to move and provides for almost immediate lift-off in the range of eight microinches. Approximate velocity of movement will be 0.5 inches per second.

In FIGS. 4, 5 and 6, a modified form of the invention is shown. As was stated, the lift-off surface is effective while surface velocity is still low, but hydrodynamic effects or the pumping effects can be utilized for support at higher speeds. A type of bearing that will permit this action is a part spherical bearing with a truncated or flat surface opposite from the drive shaft that is used, and of course centered on the central axis of the drive shaft. In FIG. 4, a bearing base or support indicated generally at 30 is provided with a part spherical, concave interior receptacle 31. This type of device is normally impossible to use with a gas hydrodynamic bearing because there is bound to be line contact between the part spherical receptacle surface 31, and the surface of a part spherical ball 32 that mates with it. As shown herein, the ball 32 has a shaft 33 fixed thereto which is used for a drive spindle or for other suitable uses.

The ball 32 is partly broken away, to show an outer surface area 34 that has logarithmic spiral grooves indicated at 35 defined therein which leave lands 36 between. The surface 31 is a smooth surface, and the lands 36 mate with this surface. The clearances, of course, are enlarged for the sake of clarity, but there would be surface contact when the unit is not rotating. The ball is truncated, so that it is only part spherical, and has a bottom surface indicated at 38 that is flat, that mates with a bearing surface 39 that is also flat, and which provides for the lift-off of the ball 32 relative to the part spherical surface 31 at low relative surface speeds. The surfaces 3S and 39 are made to contact at no relative speed with the surfaces 31 and 36 of the lands still separated so that there is no contact of the part spherical surfaces at rest. As can be seen in FIG. 5, the surface 39 has a number of spaced grooves 40 defined therein which have leading edges indicated at 41 that are tapered as shown generally and explained in connection with FIG. 3. As rotation of the ball 32 in direction as indicated by the arrow 42 occurs, the same action of adding molecules to the interface between the surfaces 38 and 39 (the surfaces 39 are the land surfaces) will occur. A central recess 42 can be provided for convenience purposes or for an air reservoir, and it can be seen that the grooves 41 are angled so that they will tend to pump air inwardly from the outer peripheral groove 44 that provides make-up air as lift-off starts to occur.

In this form of the invention, the same type of action occurs, except that as the shaft gets up to speed, rotating as shown by the arrows 42 in FIG. 5 and 45 in FIG. 6, the grooves and lands 35 and 36 on the ball 32 will provide a hydrodynamic bearing; that is, pumping air in to provide a fluid air cushion between the land surfaces 36 and the inner surface 31 of the bearing seat.

Thus, the compound bearing as shown in this form of the invention provides for lift-off of the flat surfaces to ensure early separation of surfaces 31 and the land surfaces 36 until the rotating shaft 33 and the ball 32 get up to a particular speed, at which the hydrodynamic effects will take over and permit the ball to rotate at as high a speed as 3600 r.p.m. for disc drives, for example, without any adverse effects. The hydrodynamic bearing between the part spherical surfaces keeps the shaft centered, and carries axial load of the shaft as well as lateral or radial loads on the shaft.

Again, the same lift-off action occurs where the initial molecular film between the surfaces 3S and 39 will be placed into activity by relative motion as soon as there is any relative motion to provide the lift-off effects due to the molecular activity and the increase in the molecular mean-free path support spacing. The tapered edge as shown at 41 will permit the moving surface to drag in additional air molecules until such time as the speed is increased to a point where the hydrodynamic effects due to the logarithmic grooves 39 on the ball 32 acting relative to surface 31 achieve a hydrodynamic bearing support.

Figure 7:
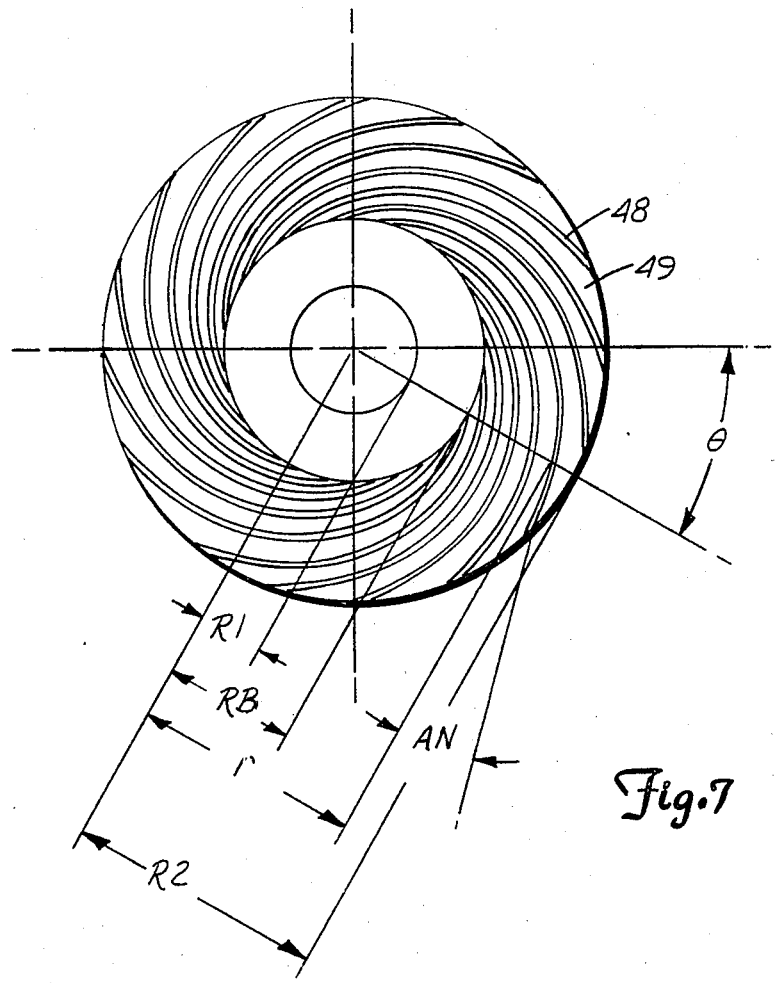
FIG. 7 is a plan view of a typical flat support surface used with the present invention.
Figure 8:
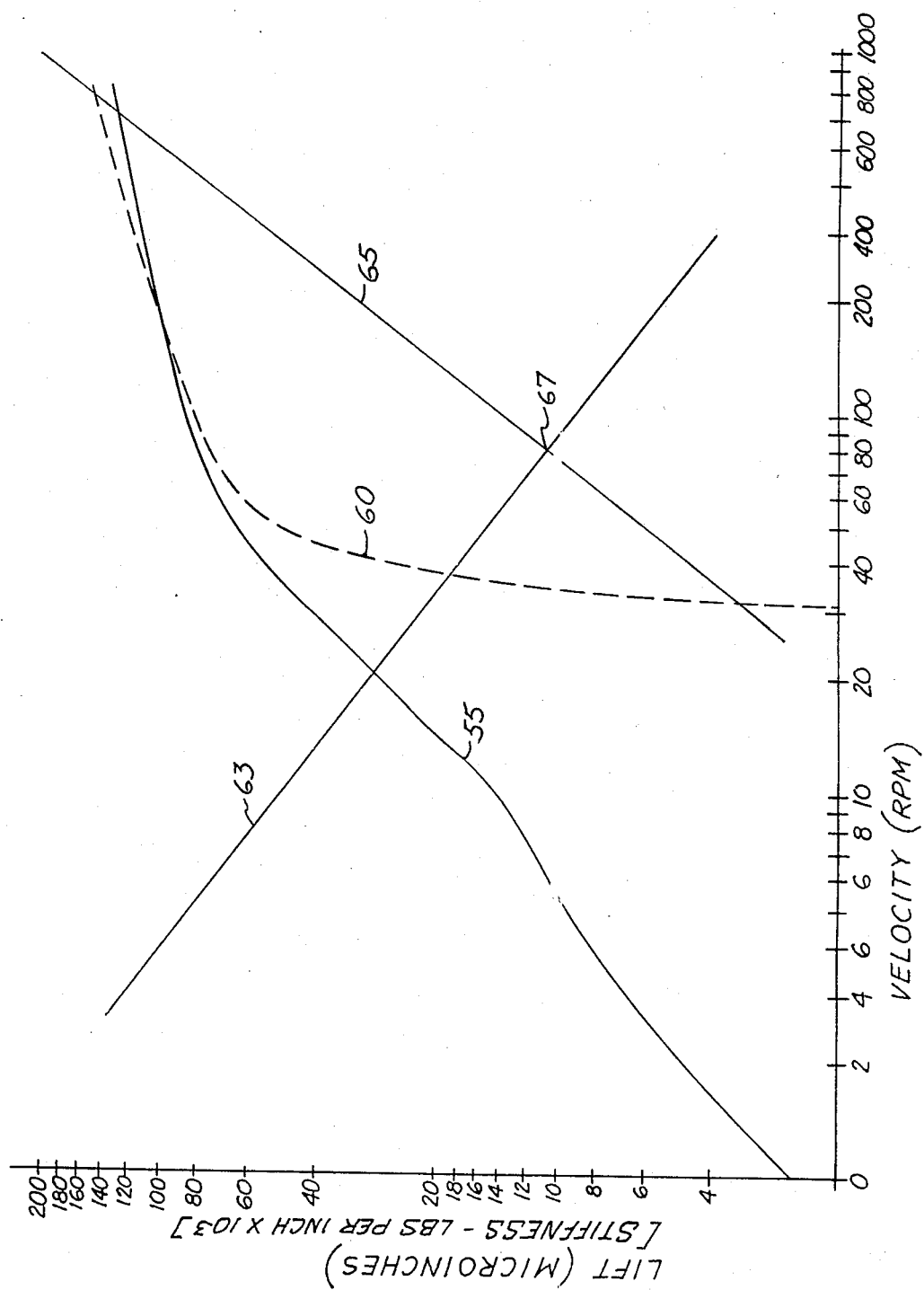
FIG. 8 is a composite graphical representation on a logarithmic scale of surface spacing versus surface velocity of an average of tests run using a device of the present invention and a second curve of calculated data for hydrodynamic bearings using equations developed in the prior art Muijderman work and also contain plots of bearing stiffness for the gas energized particle bearing and hydrodynamic bearing.

FIG. 7 shows a representation of a test bearing support surface that is similar to surface 13, using logarithmic spiral grooves shown at 48, with lands 49 between the grooves. This type of logarithmic spiral groove was found to provide the necessary lift-off using the molecular activity lift-off phenomena, and also provide at higher r.p.m. the hydrodynamic bearing that will support the member 11 on such surface. This type of surface shown in FIG. 7 was utilized on both sides of a rotating disc for test purposes that are illustrated in FIG. 8, as will be discussed.

The grooves have a groove end radius indicated at RB in FIG. 7, a radius R1 which is the inner radius to form a recess 49, and an outer radius R2 which is the outer radius for the side surface of the support member. The spiral grooves have a lead angle AN, and generally are formed to have a depth at a selected compromise value, rather than at an optimum, which will provide a relatively low lift-off r.p.m. and still provide an adequate load carrying capacity. With groove depths in the range of 40 microinches, a six pound load was found to lift-off at 4 r.p.m. (about 0.4 inches per second average velocity), and at deeper groove depths the lift-off r.p.m. was higher. The groove depth is a variable that has to be matched to a narrow load range desired, and if one looks for a lift-off height between the mating surfaces of eight microinches, a groove depth of 40 microinches or less would be desired. However, in order to obtain a supported height between the surfaces of 270 microinches in operation, a compromise value of about 90 microinches depth is provided and is believed adequate. Lands 49 are formed between the grooves, and the width of the lands 49 are substantially equal to the width of the grooves.

An alternative configuration would be to alternate the depths of the grooves; that is, have every other groove shallow such as in the range of 40 microinches, and if every other groove is deep in the supported height at 3600 r.p.m., the design speed should be in an operable range, and adequate load carrying capability should be available.

In order to accomodate the invention, the facing surfaces must be flat; that is, true to profile within 2-10 M.M.F.P. widths of room temperature gas (5-25 microinches). In flatness, there has to be an average deviation that is no less than one molecular mean-free path, and average no greater than five molecular mean-free paths, which is generally considered to be slightly more than the lift-off height of 8 microinches. As soon as energy is added by relative motion, lift-off occurs, as exemplified by the plot 55 in FIG. 8 when lifting off from a 3 square inch surface (2.5 in. dia) with a normalized 1 pound weight supported by the bearing comprising a combined early surface lift off bearing of the present invention combined with a hydrodynamic bearing such as that disclosed in the prior art while measurements were taken (the stiffness or load capacity will be discussed in relation to the illustrations of other plots in FIG. 8).

Figure 1:
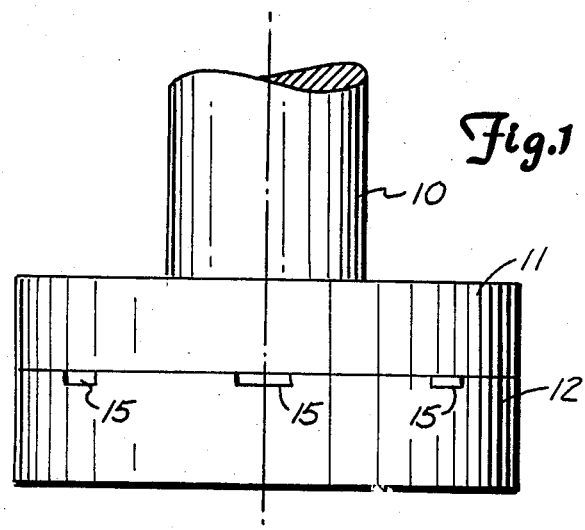
FIG. 1 is a side view of a typical disc drive shaft having a hydrodynamic bearing made according to the present invention installed therein.

The support surface used was made with grooves as explained in connection with FIG. 7, supporting a flange such as that shown at 11 in FIG. 1. Complete lift-off is defined to occur at 8 microinches, and by the time when an average surface velocity of 0.5 inches per second (6 r.p.m.) was achieved, the separation between the surfaces was substantially higher than lift-off height, and continued to increase as the r.p.m. increased. Above a surface velocity of about 1.5-2.5 inches per second (20-30 r.p.m.), pumping action starts to take place in accordance with the previous prior art hydrodynamic devices, to provide the air cushion for holding the surfaces on a hydrodynamic bearing.

In contrast, using the same dimensions for lands and grooves (without the tapered lead in edges on the lands), and an equal force on the bearings surfaces, calculations utilizing the Muijderman formula (not actual tests), show in plot 60 in FIG. 8 that in order to get 20 microinches of surface spacing one has to have the moving surface rotating in the range of 35 r.p.m. (3 in/sec), and that before 80 microinches of separation is achieved the r.p.m. must be up in the range of 80-90 r.p.m. (6.5 in/sec). Thus, significantly better initial lift-off characteristics are achieved by having the surfaces constructed properly as taught herein, and relying upon the molecular activity that occurs by adding energy when the molecules are restrained between the surfaces with the spacing at less than five molecular mean-free paths, and greater than one molecular mean-free path. This traps the energized molecules between the surfaces causing the molecules to provide the lift that is necessary as soon as the energy is added by relative motion. The plot 55 of FIG. 8 merges with plot 60 because the hydrodynamic effect of the bearing operated to obtain plot 55 will nearly follow plot 60 above about 120 microinch spacing. The combined bearing of the present invention actually is sightly lower in performance because of the modifications to obtain early lift-off than the calculated hydrodynamic bearing at the higher r.p.m.

The tapering inlet edges on the lands of the present invention permit additional molecules to be carried in and provide trapping of these molecules for sustaining the early lift-off characteristics as the molecules get heated and expand, so that they continue to provide the lifting properties until such time as the normal hydrodynamic bearing activity occurs.

The stiffness of a hydrodynamic bearing increases with surface velocity while the stiffness of the present low velocity energized gas particle bearing decreases in stiffness with greater surface velocity and increasing altitude or space. The stiffness curves of the two types of bearings are also shown in FIG. 8. The plot or line 63 illustrates the stiffness characteristics of the early lift off gas energized bearing relative to surface velocity. The stiffness decreases as a second power function with surface velocity and increased spacing. The vertical logarithm scale in FIG. 8 for stiffness is in thousands of pounds per inch. The line or plot 65 illustrates the stiffness of a hydrodynamic bearing versus surface velocity. The stiffness is low at low surface velocities and increases as a cubic function with surface velocity as the bearing pumping action increases.

The stiffness curves 63 and 65 intersect at point 67. Thus the early surface lift-off bearing shown to provide load support at low velocities and the hydrodynamic's bearing takes over to provide load support at higher r.p.m.'s.

The curve 63 shows a direct decrease in stiffness as a function of increase in altitude or spacing between the surfaces. The surfaces reach a spacing which is a balance between the load and the spacing and as the surface reaches a certain altitude or spacing, another bearing system such as a hydrodynamic bearing must take over for higher speed operation. Thus, the present system provides a very stiff bearing for immediate lift-off at low clearances, and the hydrodynamic bearing will take over at greater clearances.

It can thus be seen that the early lift-off shown by plot 55 is due to the energization of the gas particles of the present invention rather than the Muijderman formula pumping action.

Although the present invention has been described with reference to preferred embodiments, workers skilled in the art will recognize that changes may be made in form and detail without departing from the spirit and scope of the invention.

What is claimed is:

1. A gas energized particle bearing between two facing, relatively movable, complementally shaped surfaces operating in a gas environment, wherein one surface at times has a velocity relative to the other, comprising a set of a plurality of grooves and lands formed in at least one of the complementally shaped surfaces, said set being at least partially transverse to the direction of relative movement between the complementally shaped surfaces, the lands having land surfaces facing the other surface, the facing surfaces including the land surfaces each being sufficiently true to its desired cross-sectional profile so that the spacing of the surfaces is between 1 and 5 molecular mean-free paths of the gas forming the gas environment at rest, wherin the land surface of each of the lands has a leading edge portion with respect to the direction of relative movment of the surfaces, and the leading edge portions are tapered and start at a spacing from the complementally shaped surface in the range of 10 molecular mean-free paths of the gas environment and taper toward the complementally shaped surface and extend in direction of relative movement for no more than 10% of the respective land surfaces.

2. A gas energized particle bearing formed by a gas between two facing, relatively movable, complementally shaped surfaces, wherein one surface at times has a velocity relative to the other, comprising a set of a plurality of grooves and lands formed in at least one of the complementally shaped surfaces, the grooves and lands of said set being at least partially transverse to the relative direction of velocity between the complementally shaped surfaces, each land of a set having a land surface facing the other complementally faced surface and a leading edge portion when viewed with respect to the relative direction of velocity between the complementally shaped surfaces, each leading edge portion being tapered from a starting position spaced away from the opposite complementally shaped surface in the range of ten molecular mean-free paths of the gas at ambient temperature, and the taper of each land leading edge portion having a length in the direction of relative movement no less than 100 molecular mean-free paths and the land being left with a surface length in direction of relative movement substantially greater than the length of the leading edge portion.

3. The system of claim 2 wherein the complementally shaped surfaces are each true to its desired cross-sectional profile within 5 molecular mean-free paths of the gas at ambient temperature.

4. The system of claim 3 wherein the average deviation of the complementally shaped surfaces is less than five molecular mean-free paths of the gas at ambient temperature.

5. The system of claim 2 wherein the length of the taper of each leading edge portion is no greater than 10% of the length of the respective land surface in the direction of relative movement.

* * * * *